April 22, 1952  D. SCHMITT  2,593,802
FUEL FLOW REGULATOR FOR SUPERCHARGED AIRCRAFT ENGINES
Filed April 19, 1948  5 Sheets-Sheet 1

INVENTOR
*Desire Schmitt*

*E. F. Wenderoth*
ATTORNEYS

April 22, 1952  D. SCHMITT  2,593,802
FUEL FLOW REGULATOR FOR SUPERCHARGED AIRCRAFT ENGINES
Filed April 19, 1948  5 Sheets-Sheet 2

INVENTOR
Desire Schmitt

BY E. F. Wenderoth
ATTORNEYS

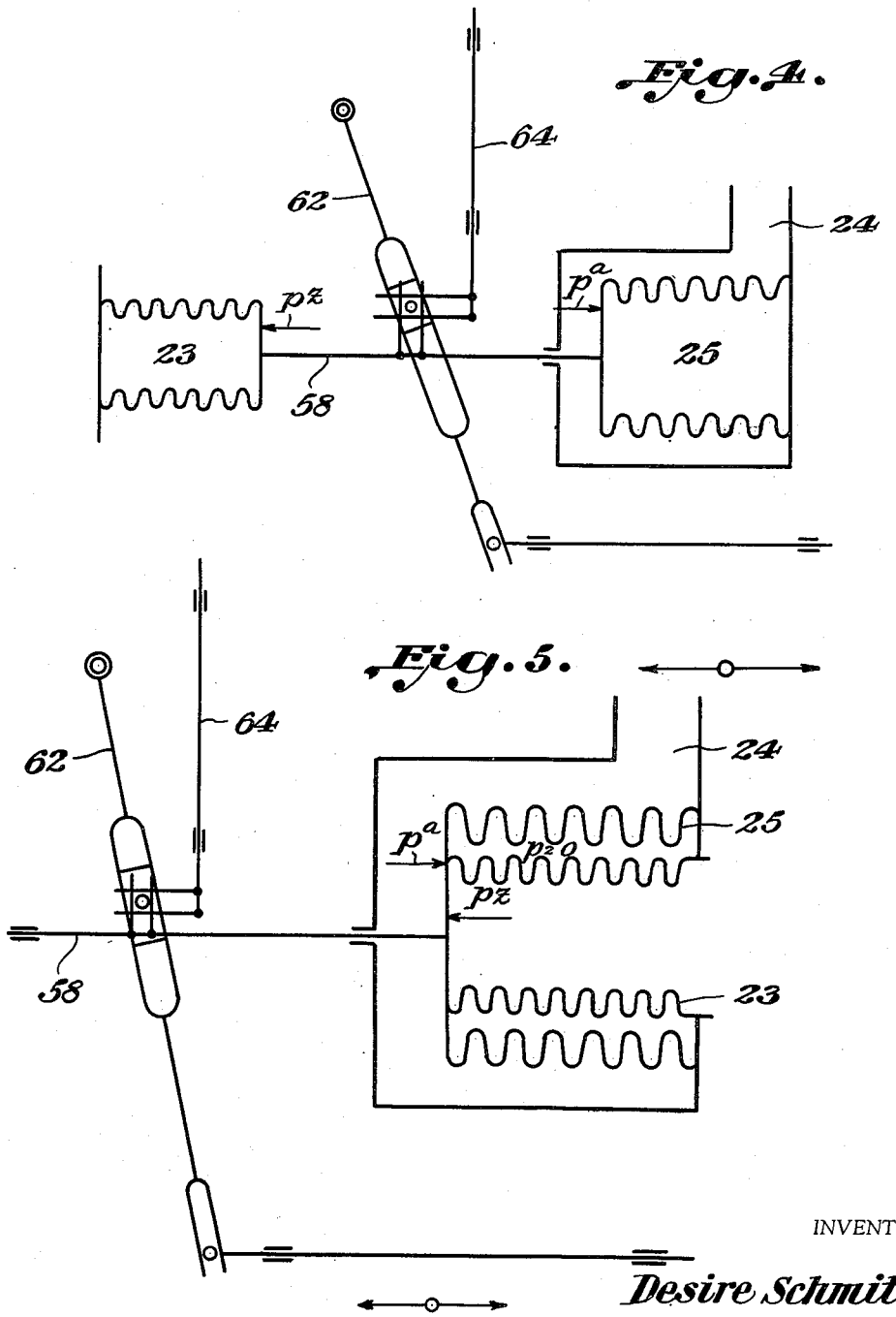

INVENTOR
Desire Schmitt

BY E. F. Wenderoth
ATTORNEYS

INVENTOR
Desire Schmitt

BY E. F. Wenderoth
ATTORNEYS

Patented Apr. 22, 1952

2,593,802

UNITED STATES PATENT OFFICE 2,593,802

FUEL FLOW REGULATOR FOR SUPERCHARGED AIRCRAFT ENGINES

Désiré Schmitt, Saint-Maur, France, assignor to "Ateliers de Constructions Lavalette," Saint-Ouen, France, a French corporation Application April 19, 1948, Serial No. 21,947
In France April 18, 1947

7 Claims. (Cl. 123—103)

(Granted under the provisions of sec. 14, act of March 2, 1927; 357 O. G. 5)

An aircraft engine operates under well defined conditions such as speed, induction pressure, induction temperature, altitude, richness of the mixture of the charge and an air-flow coefficient for the cylinders and the function of a regulator is to secure automatically and for each speed of the engine a suitable ratio of the fuel and air supplied to the engine.

The weight of the fuel to be supplied to a cylinder per cycle depends on two essential and independent factors:

a. On the weight of air introduced per cycle into the cylinder, and b. On the richness of the mixture.

The weight of air introduced per cycle into a two or four stroke cylinder is itself a function of several variables which are the intake pressure, the intake temperature, the exhaust pressure, i. e. the altitude and the flow coefficient, the latter in turn being a function of the engine speed in revolutions per minute, of the richness of the mixture and of all the previously mentioned variables.

The richness of the mixture however is a function only of the operating rate of the engine, i. e. of its speed in revolutions per minute and of the adjustment of the intake pressure. It therefore depends upon the position of the throttle. This pressure is not always equal necessarily to that corresponding to the position of the throttle. As long as the engine operates at an altitude lower than or equal to the critical altitude, the intake pressure corresponds to the position of the throttle.

Above the critical altitude the richness of the mixture is a function of the position of the throttle and the intake pressure decreases while the richness of the mixture remains constant.

The weight of the fuel introduced per cycle into a cylinder will thus be a function at the same time of the following variables:

1. The intake pressure.
2. The intake temperature.
3. The altitude.
4. The flow coefficient.
5. The richness.

An object of the present invention is to provide a fuel flow regulator for super-charged internal combustion engines equipped with means for supplying the fuel.

It is an object of the invention to provide a regulator comprising on one hand special deformable elements acted upon by the three first mentioned variables above and on the other hand a cam connected to the throttle having a profile controlling the product of the last two mentioned variables, namely: The flow coefficient by the richness of the mixture.

A further object of the invention is to provide means whereby the above elements act through a suitable mechanism on the means for supplying fuel to the engine whereby an exact mixture of the fuel is provided. For a proper understanding of the invention the adjustment of the flow of fuel will be studied successively as a function of the five variables above mentioned. In the following description it has been assumed that the regulator controls a pump for supplying the fuel although the invention is not limited to such an application.

With the above and other objects in view which will become apparent from the description below, the invention is shown in the drawings in which:

Fig. 4 is a diagrammatic view illustrating a modified construction;

Fig. 5 is a similar view indicating another modified construction;

The regulation of the fuel flow as a function of the intake pressure will first be considered.

Figure 1:
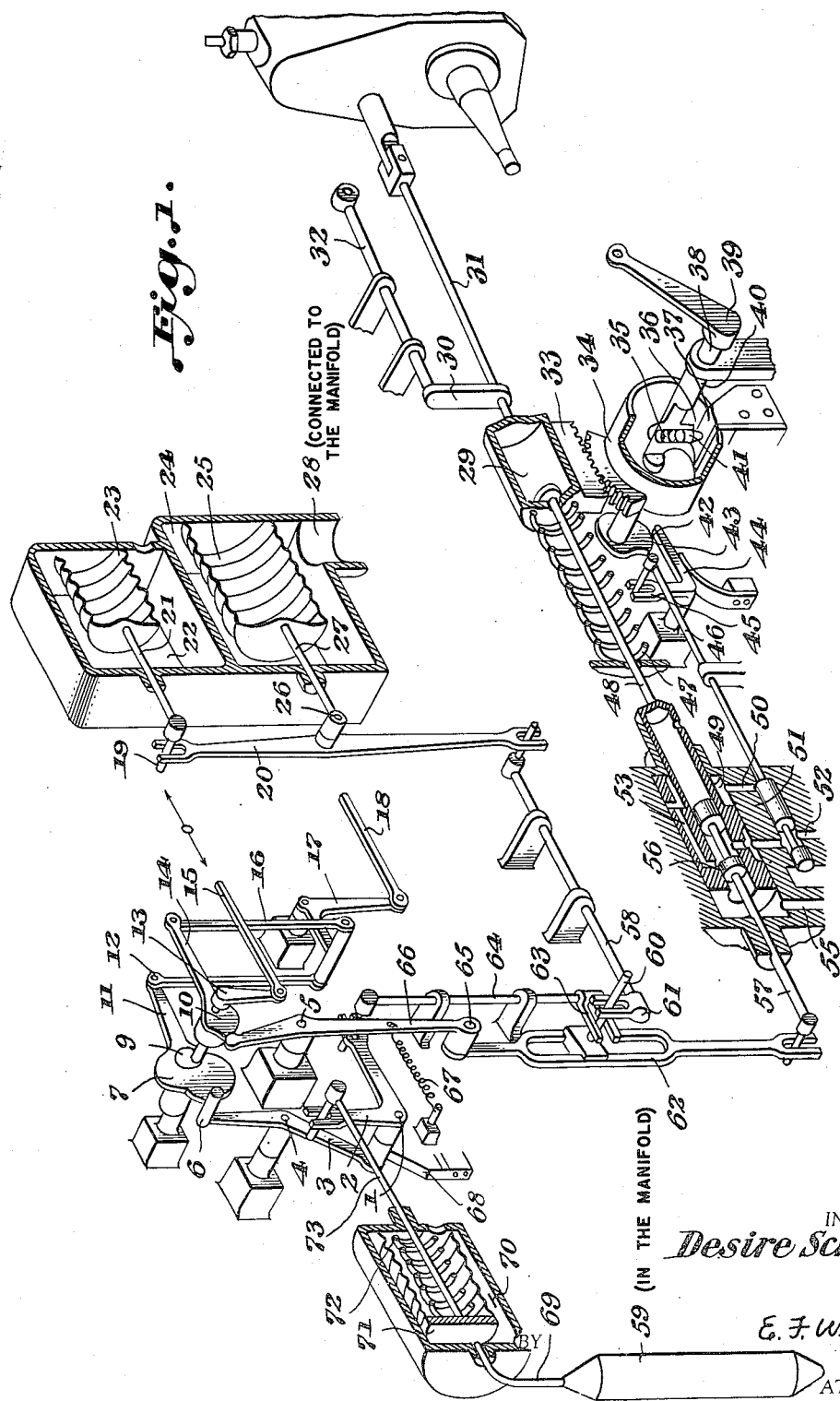
Fig. 1 is a diagrammatic view of the regulator.

Referring to Fig. 1 a chamber 24 is in communication with the intake manifold, not shown, by means of a pipe 28. In chamber 24 an aneroid capsule 25 is positioned having one of its ends attached to a wall of the chamber 24 and its other end connected to a rod 27 which in turn is pivotally connected to a lever 20. The lever 20 in turn acts at its lower end on a rod 58 which drives by means of a fork 61 a pin 60 having a base slidably mounted in an enlarged opening provided in the lever 62.

The lever 62 is pivotally mounted upon shaft 65 and coacts with the slide valve 57 of a servomotor. The slide valve reciprocates within a piston 54 and the piston 54 reciprocates within the cylinder 51. Oil under pressure enters through a duct 52 and a shoulder 56 on the slide valve 57 controls a duct 53 leading to the space 49. A third duct 55 permits the return of oil from the space 49 to the casing of the regulator.

The piston 54 has attached thereto a rod 48 terminating in a shoulder which bears against a wall of a chamber provided in a member 29. A spring 47 constantly urges the member 29 against the shoulder upon the rod 48 so that the member 29 follows the movements of the piston 54. Attached to the member 29 is a rod 31 terminating in a yoke which drives either directly or through a system of levers, pivots or connecting rods, the control lever or rod of the fuel supply pump.

When the intake pressure increases from $P_0$ to $P_1$ the capsule 25 is compressed. This causes the rod 27 to move the lever 20 from left to right as seen in Fig. 1. With the pin 19 remaining fixed temporarily the lower fork of the lever 20 will move the rod 58 from left to right and by fork 61 and pin 60 the lever 62 is swung counterclockwise about the shaft 65 which is temporarily fixed. The slide valve 57 therefore is moved towards the right and the shoulder 56 uncovers the duct 53 thereby placing the space 49 in communication with the oil evacuation duct 55 bringing about a pressure drop inside the space 49. Due to the action of the spring 47 the member 29 and piston 54 are also moved towards the right.

With a portion of the oil contained in the space 49 expelled through the duct 53 and the evacuation duct 55 the motion continues until the piston 54 has caught up with the movement of the slide 57. At such time the duct 53 is again blocked by the shoulder 56 on the slide valve. This motion from left to right causes the rod 31 to bring about a larger flow of fuel to the engine.

In case there is a decrease in the intake pressure then the capsule 25 expands and the motions described above take place in the opposite direction.

The shoulder 56 on the slide valve 57 in moving towards the left in such case uncovers the opening of duct 53 and thus places duct 52 in communication with space 49. In such case oil under pressure entering through the duct 52 will bring about a displacement of the piston towards the left. The spring 47 is compressed and as previously described all motion will stop as soon as the lower opening of the duct 53 is again blocked by the shoulder 56 of the slide valve 57.

A movement towards the left brings about a decrease in the flow of fuel from the supply pump.

The movements of the slide valve 57 therefore directly controls the fuel supply from the pump to the engine.

The means for securing an adjustment of the fuel flow as a function of the intake temperature will now be described.

The means for bringing this about comprises a thermostat 59 connected by a tube 69 to the space 70. The space 70, the tube 69, and the thermostat form a closed space which is filled with a non-congealable liquid having a high coefficient of expansion. The thermostat 59 is located in the intake manifold. In order to prevent any vaporization of the liquid at the high temperatures prevailing in the intake manifold a spring 72 acts upon a capsule 71 which are housed in the space 70.

The capsule 71 has fixed thereto a rod 73 which coacts with a forked bell crank lever 2 pivoted at 1. The lever 2 in turn coacts with a rod 64 provided with a fork 63 which encloses the pin 60. By this means the base of the pin 60 may be displaced by the movements of the rod 64 within the enlarged opening of the lever 62 independently of the position of the rod 58.

Figure 2:
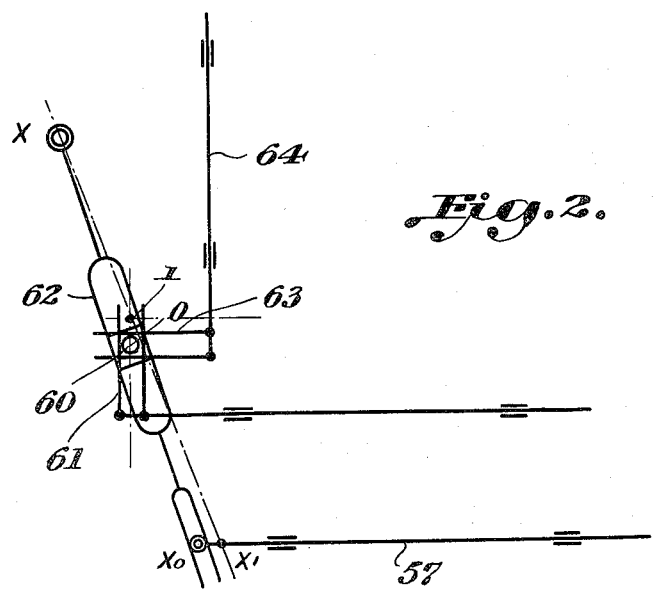
Fig. 2 is a diagrammatic view illustrating the correction of the regulator in accordance with the temperature.

To secure a temperature correction of the fuel supply the operation is as follows:

Let us assume that the engine is working at a certain intake temperature $T_0$ and that the lever 62 has the position $x—x_0$ indicated on Fig. 2, its vertical position (Fig. 1) corresponding to a zero flow.

Let us assume now that the intake temperature drops from $T_0$ to $T_1$, with all the other variables, i. e. the intake pressure, the intake temperature, the altitude, the flow coefficient, the mixture richness remaining constant, including the speed of the engine.

The liquid contained in the thermostat 59 will decrease in volume, which will cause the capsule 71 to lengthen as part of the liquid contained inside the space 70 will flow through the capillary tube 69 into thermostat 59. Through rod 73, and lever 2, the capsule causes the rod 64 to move upwardly.

The pin 60, Fig. 2, is guided vertically by fork 61, the latter remaining motionless for the time being. Fork 63 drives it from pint O to point I. Due to this fact, the lever 62 is inclined more and passes from position $x—x_0$ to position $x—x_1$. Consequently the slide valve 57 is pushed by the amount $x_0—x_1$ from left to right, which has the effect of increasing the flow of fuel.

It can easily be shown that the displacements of the rod 64 are in inverse proportion to those of the slide valve 57, which means that the flow of gasoline is in inverse proportion to the intake temperature. The mechanism therefore ensures a correct variation of the flow of fuel as a function of the intake temperature.

It is to be noted that for the vertical position of the lever 62, i. e. at its position of zero flow, the temperature variations have no action on this lever, while its action becomes more and more important as the air and fuel flow and, consequently the power of the motor increases.

The adjustment of the fuel flow as a function of the exhaust pressure drop or altitude correction will now be described.

The means for this adjustment comprises an aneroid capsule 23. This capsule is housed inside a chamber 22 which communicates with the outside atmosphere or with the exhaust manifold. The capsule 23 is attached at one of its ends to a wall of chamber 22 and acts at its free end on a rod 21 which moves the lever 20 by means of pin 19 and an upper fork on lever 20.

When the atmospheric pressure, which may be assumed to be substantially identical with the exhaust pressure decreases, i. e. at higher altitude, the capsule 23 expands. It imparts to rod 21 a right to left motion, the upper fork of lever 20 follows this motion while the lower fork of the same lever is displaced from left to right, the axle 26 remaining motionless. Due to this fact, the rod 58 is also driven in the same direction and acts on the slide valve 57 through the fork 61, pin 60 and the lever 62. The slide valve 57 moves from left to right, causing an increase in the fuel supply. In case of a decrease in altitude, all the motions take place in the opposite direction. The result will be a decrease in the flow of the fuel.

The adjustment of the mixture richness is brought about as follows.

The adjustment of the mixture richness may be effected as a function of the speed of the engine or independently thereof and the means provided comprises a cam 7 having an arm 11 pivotally connected to a connecting rod 12 which, in turn, is articulated at its lower part with a bell crank lever 17. The latter, through rod 18 is connected with the throttle controlling the speeds of the engine, together with its intake pressure.

The pin 6 of a lever 3 bears on cam 7. The shaft 1, about which rotates the lever 2 transmitting the temperature variations is associated with the lower branch of lever 3. Pin 6 is constantly urged against the cam by means of a spring blade 68. The lever 3 oscillates on a fixed shaft 4.

Let us assume the passage from an operating condition of a richness $R_0$ to another one of a richness $R_1$ lower than $R_0$. Due to the movement of the throttle causing this change in operating conditions, the rod 18 moves from right to left. The effect of this motion is to rotate the cam 7 in a counterclockwise direction. The pin 6 of lever 3 falls into the recess of the cam and the lever 3 rotates in a clockwise direction. The shaft 1, following this motion causes a lifting of the upper fork of lever 2 and a lowering of the other fork of said lever. The rod 64, therefore, moves downwardly, causing a decrease in the fuel supply corresponding to the new richness. The essential result of this operation is the change in the multiplication ratio of lever 2, which ratio is increased by the operation considered.

For an unchanged intake temperature, the fork 63 is thus at a lower position, i. e. the fuel flow is weaker and the richness of the mixture will be decreased, (see Fig. 2).

The adjustment of the richness independently of the operating conditions of the engine takes place as follows.

The cam 7 is mounted on an eccentric 9 keyed on a shaft 8. The rotation of this shaft is controlled by a lever 13 articulated with a connecting rod 15 which is operated by the pilot.

To increase the richness independently of the operating conditions of the engine, the connecting rod 15 is moved from left to right. Lever 13 moves the eccentric 9 in a counterclockwise direction moving the cam 7 to the left, and, consequently, the rotation of the lever 3 in a counterclockwise direction. The shaft 1 rotates about the shaft 4, driving the lever 2. For an unchanged intake temperature the pin of rod 73 remains motionless while the lower fork of lever 2 raises the rod 64, thus causing, according to Fig. 2, an increase of the fuel flow, i. e. of the richness.

It must be understood in all the above description, that the expression "richness" implies the product "richness times the flow factor."

The correction for the operation of the regulator at different speeds of the supply pump will now be described.

The regulator contains a special mechanism for the purpose of standardizing the displacements of the regulating element for each speed of the pump to ensure normal operation of the other correction mechanisms.

A basic condition being given, defining the zero condition for a position O of the regulating element, the correcting mechanism causes, for any other pump condition an artificial shifting of the zero condition defining always the zero condition by an extrapolation.

The main element of this correcting mechanism is cam 10 which can rotate freely about shaft 8. This cam is connected with the throttle through the arm 14, the connecting rod 16, the lever 17 and the rod 18. This same lever 17 thus controls both cams 7 and 10.

One cam 10 bears the upper arm of lever 66. This lever rotates about a fixed axis 5 and carries at its lower end shaft 65 on which rotates the lever 62. Lever 66 is constantly urged against the cam 10 by a spring 67.

Figure 3:
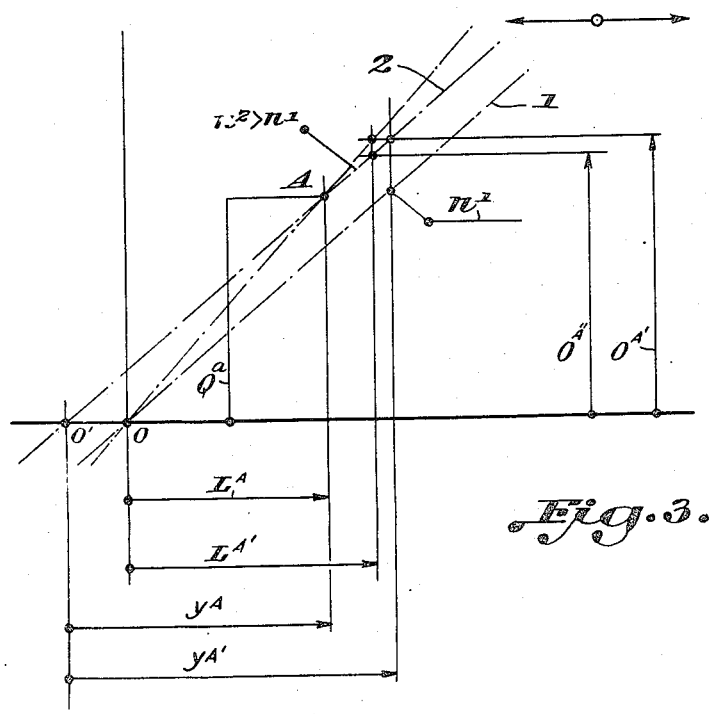
Fig. 3 is a diagram of the fuel supplied by the pump as a function of the positions taken by the regulator.

Let us assume that at $n_1$ revolutions per minute the fuel supply pump operates on a given engine in accordance with curve 1 (Fig. 3) (for instance in the economical cruising condition) and that at speed $n_2$ it works according to curve 2 whose extension does not go through the zero position of the adjustment element for the output. Let A be a point of output, curve 2, corresponding to the correct output of the pump for a given working condition of the engine (for instance for the rated climb output) and let T be the intake temperature at which this engine works.

Let us suppose first that the shaft 65 of lever 62 (Fig. 1) is immovable and that, to the vertical position of this lever corresponds the zero position of the pump regulating element. In such a case, if the temperature varies from T to $T'<T$, it will not be the initial output $Q_a$ of the pump which will be multiplied by the ratio $T/T'$, but only the run of the regulating element $L_a$. The new run will be $$L_a' = L_a \frac{T}{T'}$$

but the new output will only be $Q_a''$ instead of $Q_a'$ the latter being the new correct output.

For the new output to be $Q_a'$, the distance $Y_a$, instead of $L_a$ must be multiplied by the ratio $T/T'$. Due to this multiplication, $Y_a$ will become $Y_a'$ and $Q_a$ will become $Q_a'$, i. e. the output correction will be accurate.

For this to be possible, the vertical position of lever 62 will have to correspond, for the condition considered, not to the position O of the regulating element of the pump, but to a position O' corresponding to the point of intersection of curve 2 of the outputs with the axis of the abscissae. Thus, to obtain exact corrections for the fuel outputs, shaft 65 must be capable of sliding horizontally in such a way that the origin of the output curves (Fig. 3) be artificially modified.

The above regulation arrangement comprises, further, a rod 32 allowing the cutting off of the fuel flow by pushing from right to left. This operation is effected by the pilot, the rod 32 being connected to means under his control. The plate 30, on the rod 32 can press against the member 29 and disengage it from rod 48 by compressing the spring 47. Rod 31, following this motion from right to left, cuts off the flow from the pump whatever may be the momentary position of piston 54.

In case of a failure of the regulation mechanism, an emergency control is provided allowing the pilot to regulate the fuel flow himself during a time interval as short as possible.

The member 29 has, at its lower part, a rack 33 which meshes with a gear sector of a drum 34. In normal operation, this drum rotates freely about the shaft 38. This shaft is associated with a lever 39 which can be operated by the pilot. The shaft 38 has a housing wherein can slide a stop element 41 which is applied against a fixed cylindrical surface 37 by means of a spring 35.

The drum 34 is provided with a hole 36. The lower arm of a bell crank lever 44 presses on the cam 43, associated with the shaft 38 while the vertical arm drives the slide valve 46. The bell crank lever 44 is applied against a cam 43 by a spring.

Let us assume the regulation mechanism locked, following an accident. From that time on, the pump gives a constant output. The pilot then operates the lever 39 by moving it from right to left. The cam 43 rotates counterclockwise. The pin 42 of lever 44 moves closer to the center of the cam while the fork 45 of the same lever drives the slide 46 towards the left. Due to this action, the orifice 50 of space 49 is uncovered and the oil enclosed in said space flows to the outside. The piston 54 can thus be displaced freely, the entrance duct 52 for the oil, being closed by the shoulder of the same slide 46.

Due to the rotation of shaft 38, the stop element 41 jumps from the cylindrical surface 37 into the hole 36 of the drum, which is thus driven directly by this lever. The gear sector of the drum, in turn, drives the rack bar of the member 29 and, consequently, the regulating element for the pump.

The above description of the operation of the regulator is not limited as regards the arrangement of the various elements. It is possible to provide other arrangements, for the altitude and intake pressure capsules and by way of example, five different modifications are given hereunder.

A first modification is shown in Fig. 4.

The regulation device of Fig. 4 comprises an aneroid capsule 25 enclosed in a chamber 24 communicating with the inlet manifold.

With respect to this aneroid capsule 25 there is associated therewith a second aneroid capsule 23 subject to atmospheric pressure. The two capsules are connected by a lever 58 comprising the fork 61 and cooperating with the pin 60 of the lever 62 controlling the regulation as has been indicated above.

Moreover, the lever 64 sliding as a function of the temperature and of the richness of the mixture has at its end the fork 63 also cooperating with the pin 60 of the lever 62 acting upon the regulation.

The arrangement shown in Fig. 4 operates in the following manner:

The intake pressure acts on the aneroid capsule 25 enclosed inside chamber 24 which communicates with the intake manifold. The atmospheric pressure acts on the other aneroid capsule 23. The two capsules are in line. Their outer ends are fixed. Their inner ends are connected by a fork carrying bar 58 which acts on the pin of the slide block of lever 62. The remaining mechanism is identical with that of Fig. 1, particularly as regards the temperature correction transmitted by the fork-carrying bar 64. It is seen from Fig. 4, that an increase of the intake pressure $p_a$ causes an increase of the output of the pump. The same thing takes place upon a decrease of the atmospheric pressure $p_z$, i. e. for an increase in altitude. A second modification is shown in Fig. 5.

The arrangement of Fig. 5 comprises an aneroid capsule 25 enclosed in a chamber 24 communicating with the inlet manifold. At the interior of this capsule there is located a second aneroid capsule 23 communicating with atmospheric pressure. These two capsules act upon a lever 58 comprising a fork 61 acting upon the pin 60 of the regulation control lever 62. In the same manner the lever 64 whose movement is a function of the temperature and of the richness of the mixture has at its end a fork 63 also cooperating with the pin 60 of the regulation control lever 62.

The arrangement operates in the following manner:

The chamber 24 is in communication with the intake manifold. In this chamber is a double capsule. Outwardly, it is acted upon by the intake pressure, inwardly by the atmospheric pressure. A vacuum exists between the outer and inner envelopes 25 and 23 respectively. The combined capsule acts on a fork carrying rod 58 whose fork acts on the pin of the slide block of lever 62. The remaining mechanism is identical with that of Fig. 1 particularly as regards the temperature correction transmitted onto lever 62 by the fork carrying rod 64.

It is seen from Fig. 5 that an increase of the intake pressure $p_a$ will cause an increase of the output of the pump. The same thing will take place for a decrease in the atmospheric pressure $p_z$, i. e. for an increase in altitude. A third modification is shown in Fig. 6.

Figure 6:
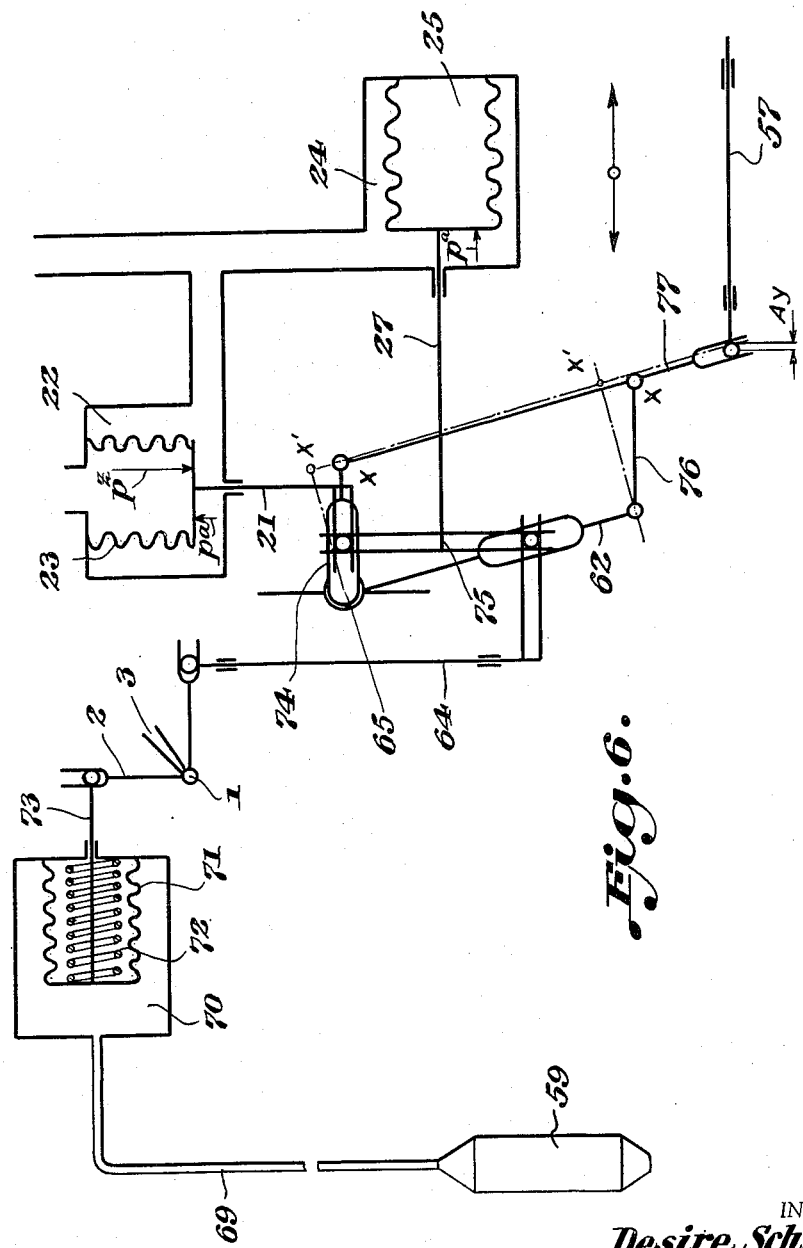
Fig. 6 is a similar view indicating a still further modification.

The arrangement of Fig. 6 comprises a first aneroid capsule 25 enclosed in a space 24 having a connection with the inlet manifold and a second aneroid capsule 23 enclosed in a space 22 is also in communication with the inlet manifold.

The aneroid capsule 25 acts upon a double fork 75 through the intermediary of a rod 27. The lower fork of the double fork 75 acts upon the other slide block of the lever 62 of the regulation control while the upper fork acts upon the slide block of a lever 74. The lever 62 and the lever 74 can turn independently of one another about the point 65. Upon the other slide block of the lever 62 a rod 64 acts in the same manner as above whose sliding is a function of the inlet temperature and the mixture richness.

The arrangement operates in the following manner:

Three capsules are used in this system. The difference in this system, with respect to the others, consists in the altimetric capsule which is not a vacuum but rather a differential capsule, i. e. the intake pressure acts on the outside of the capsule and the atmospheric or exhaust pressure acts on the inside. The correct adjustment of the gasoline flow is obtained by the deformation of a parallelogram, as will be explained below.

The chamber 24 as well as the chamber 22 are in communication with the intake manifold. In these two chambers, there is thus constantly an intake pressure $p_a$. The chamber 24 contains the aneroid capsule 25, one end of which is attached to the wall of the chamber and the travel of the other end of which is proportional to the atmospheric pressure. This capsule acts on a double fork 75 through a rod 27, the lower fork acts on the slide pin of lever 62 and the upper fork acts on the slide pin of lever 74. These two levers can turn independently about shaft 65. The slide pin of lever 62 is acted upon also by the fork of rod 64 which moves perpendicularly to the rod 27 and whose motions are proportional to the intake temperature, as explained above. The chamber 22 contains a differential capsule 23 whereon the intake pressure $p_a$ acts outwardly and the exhaust (or atmospheric) pressure $p_z$ acts inwardly. This capsule acts on the slide pin of lever 74 by means of the fork carrying rod 21 which is perpendicular to rod 27 and parallel to rod 64. The displacements of rod 21 are thus proportional to $p_a-p_z$. At its lower end, lever 62 is articulated with lever 76. Levers 76 and 74, in turn, are articulated with lever 77 in such a manner that the assembly of levers 62, 74, 76, 77 forms a parallelogram, an apex of which is fixed, at 65. The lever 77 acts, by means of a fork, on the slide of the servo-motor 57 and, therefore, on the regulating element of the pump as explained above.

Let us assume that the engine operates at well defined speed, intake pressure and intake temperature, and that only the exhaust pressure varies.

Due to the drop in pressure $p_z$ the capsule 23 is shortened and lifts the slide pin of lever 74. Due to this motion, lever 77 passes from position $x-x$ to position $x-x'$. It is found that, by this motion, the slide 57 is displaced from left to right by the amount $\Delta Y$, i. e. the fuel flow is increased proportionally to the difference $p_a-p_z$.

Figure 7:
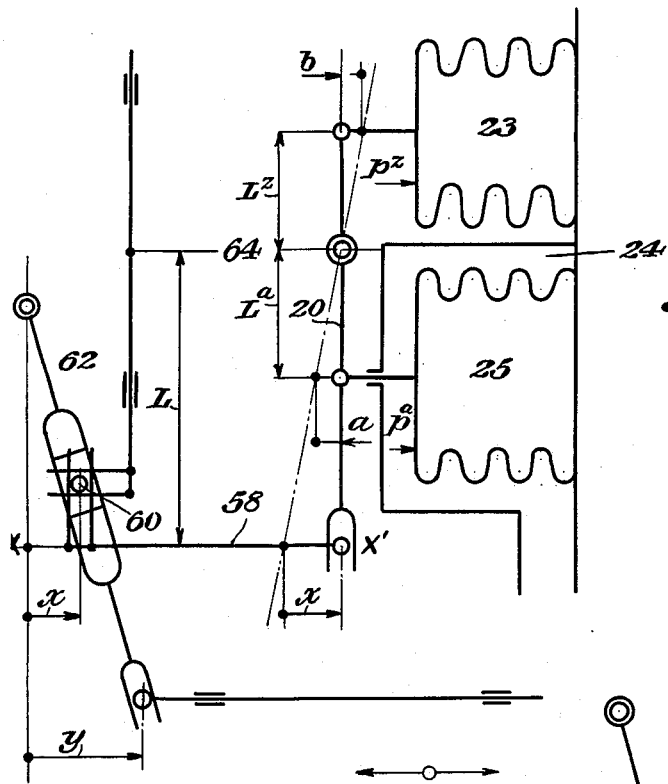
Fig. 7 is a similar view of a fourth modification.

A fourth modification is shown in Fig. 7.

The arrangement of Fig. 7 comprises in the same manner as set forth above an aneroid capsule 25 enclosed in a chamber 24 in communication with the inlet manifold.

The exhaust pressure acts upon another aneroid capsule 23. The aneroidic capsule 23 acts at upper portion of a lever 20 rotating about an axis 78 while the other aneroid capsule 25 acts upon the lever 20 located at the other side of the oscillation axis of said lever. This lever 20 terminates in a fork acting upon a pin integral with the end of the lever 58. The lever 58 terminates in a fork 61 cooperating as set forth above with the pin 60 of the lever 62 for control of the regulation. Moreover, the lever 64 controls a second fork 63 also cooperating with the pin 60 of the regulation control lever 62. This rod 64 slides as a function of the inlet temperature and the mixture richness.

The arrangement operates in the following manner:

The intake pressure $p_a$ acts on an aneroid capsule 25 enclosed inside a tight chamber 24 which is in communication with the intake manifold and wherein, therefore, the intake pressure always obtains. The exhaust or atmospheric pressure acts on another aneroid capsule 23. The two capsules act on a common lever 20 which is articulated at a fixed point 78. This lever, has at its lower part a fork, which acts in turn on the fork carrying rod 58. The fork of this rod drives the slide pin 60 of the lever 62.

The remainder of the regulating mechanism is identical with that of Fig. 1, particularly as regards the temperature correction transmitted by the fork carrying rod 64.

When the intake pressure increases capsule 25 is shortened and drives rod 58 from left to right, the effect of which is an increase of the fuel flow. The same motion of rod 58 occurs when the exhaust pressure $p_z$ decreases, i. e. when the aircraft climbs, and due to this pressure decrease, capsule 23 expands, causing the counterclockwise rotation of lever 20.

Figure 8:
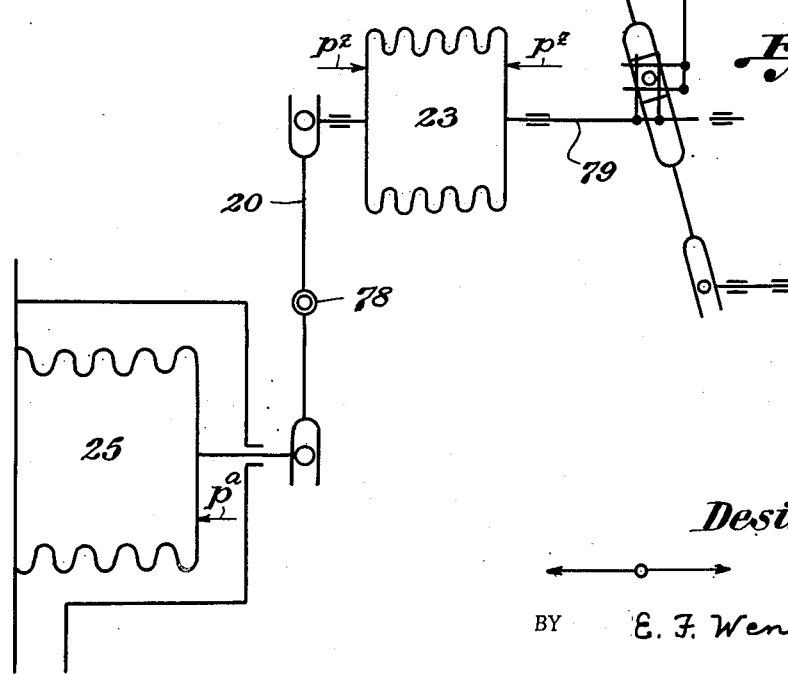
Fig. 8 is a similar view illustrating a fifth modification.

A fifth modification is shown in Fig. 8.

The arrangement of Fig. 8 comprises an aneroid capsule 25 located in a chamber 24 in communication with the inlet manifold and a second aneroid capsule 23 is subjected to the exhaust pressure.

These two capsules act upon the respective ends of a lever 20 oscillating about the axis 78. This action is transmitted for each of the capsules 23 and 25 by a pin sliding in a fork located at the end of lever 20. Moreover, the movement of the lever 20 under the action of the capsule 25 is transmitted to the capsule 23 subjected to the exhaust pressure. This capsule 23 is connected at its other end to a rod 79 comprising a fork 61 cooperating with the pin 60 of the regulation control lever 62.

In the same manner as in the preceding modification a rod 6 sliding as a function of the temperature and the richness of the mixture acts by a fork 63 upon the pin 60 of the regulation control lever 62.

The device operates as follows:

In this variant, the intake and exhaust pressure capsules are arranged in series. The intake pressure $p_a$ acts on capsule 25. The free end of the capsule acts through a rod on the forked lever 20 rotating about a fixed point 78. The upper fork of this lever drives a second capsule 23 having rods at both ends sliding inside soft friction sockets. The exhaust or atmospheric pressure acts on this capsule. The right hand rod 79, on this capsule, carries a fork which, in its motions, drives the slide pin of lever 62 and consequently the slide of the servo-motor controlling the flow.

The remaining mechanism is identical with that described above, particularly as regards the temperature correction which is transmitted by the fork carrying rod 64 as has been explained above.

The operation is as follows:

When the intake pressure increases, capsule 25 contracts and lever 20 rotates in a clockwise direction. Capsule 23, with the fork carrying rod 79 moves to the right and increases the fuel flow.

When, under a constant intake pressure, the engine goes to a higher altitude, capsule 23 gradually expands and, in turn, increases the fuel flow by causing a left to right displacement of the slide of the servo-motor.

I claim:

1. In a fuel flow regulator for supercharged aircraft engines, a fuel supply, a first fork carrying rod, a second fork carrying rod, means for moving the first rod as a function of the intake and barometric pressures, means for moving the second rod as a function of the intake temperature and of the adjustment of the richness of the fuel mixture, means for moving said rods perpendicularly to one another, a lever arm, means for causing the simultaneous movements of said two rods to act on said lever arm, an auxiliary arm controlled by said lever arm, means for controlling a fuel supply by the displacement of said auxiliary arm so that said first rod causes motions of said controlling means proportional to its own motions, in case said second rod remains motionless and that, similarly, said second rod motions of said controlling means in inverse proportion to its own motions when said first rod remains motionless. whereby the simultaneous movement of said two rods ensures a fuel supply to the aircraft engine as a function of the barometric and intake pressures, and of the intake temperature.

2. In a fuel flow regulator for supercharged aircraft engines, a fuel supply, a first fork-carrying rod, a second fork-carrying rod, an aneroid capsule whose deformations are proportional to the intake pressure, means for coupling said capsule to said first fork carrying rod so that a deformation of said capsule causes a proportional movement of said rod, means for also causing said first rod to slide as a function of the barometric pressure, means for causing the second rod to slide as a function of the intake pressure and of the adjustment of the richness of the fuel mixture, said rods being mounted perpendicularly to one another, a lever arm, means for causing the simultaneous displacement of the two rods to act on said lever arm, an auxiliary arm co-operating with said lever arm, means for controlling said fuel supply by said auxiliary arm, so that said first rod causes motions proportional to its own in said controlling means, in case the second rod remains motionless and, similarly, said second rod causes motions in inverse proportion to its own in said controlling means when the first rod remains motionless, the simultaneous displacement of the two rods thus ensuring the supply of fuel to the aircraft engine as a function of the intake pressure, of the barometric pressure, of the intake temperature and of the richness of the fuel mixture.

3. In a fuel flow regulator for supercharged aircraft engines, a fuel supply, a first fork carrying rod, a second fork-carrying rod, an aneroid capsule whose deformations are proportional to the intake pressure, means for coupling said capsule to said first fork-carrying rod so that a deformation of said capsule causes a proportional sliding or said rod, a second aneroid capsule whose deformations are proportional to the atmospheric pressure and therefore substantially proportional to the exhaust pressure, means for coupling said second capsule with said first fork-carrying rod so that a lengthening of said capsule causes a proportional sliding of said rod, means for causing the second rod to slide as a function of the intake temperature and of the adjustment of the richness of the fuel mixture, said rods being mounted to slide perpendicularly to one another, a lever arm, means for causing the simultaneous displacement of said two rods to act on said lever arm, an auxiliary arm connected with said lever arm, means for controlling said fuel supply by the displacement of said auxiliary arm so that said first rod causes motions proportional to its own in said controlling means, in case said second rod remains motionless and, similarly, said second rod causes motions in inverse proportion to its own in said controlling means, when the first rod remains motionless, the simultaneous displacement of the two rods thus ensuring the fuel supply for the aircraft engine as a function of the intake pressure, of the barometric pressure and of the intake temperature.

4. In a fuel flow regulator for supercharged aircraft engines, a fuel supply, a first fork-carrying rod, a second fork-carrying rod, means for causing said first rod to slide as a function of the intake and barometric pressures, a thermostat located in the intake manifold, an airtight chamber, a conduit connecting said thermostat and chambers, a capsule in said chamber filled with a liquid having a high coefficient of expansion so that variations in said capsule are proportional to the intake temperature, means for coupling said capsule with said second fork-carrying rod so that the sliding motions of said second rod are proportional to the intake temperature, means for also causing said second rod to slide as a function of the richness of the fuel mixture, said rods being mounted to slide perpendicularly to one another, a lever arm, means for transmitting the simultaneous displacement of said two rods to said lever arm, an auxiliary arm connected to said lever arm, means for controlling said fuel supply by the displacement of said auxiliary arm so that said first rod causes motions proportional to its own in said controlling means in case said second rod remains motionless and, similarly, said second rod causes motions in inverse proportion to its own in said controlling means, when the first rod remains motionless, the simultaneous displacement of the two rods thus ensuring the supply of the aircraft engine with fuel as a function of the intake pressure of the barometric pressure, of the intake temperature and of the richness of the fuel mixture.

5. In a fuel flow regulator for supercharged aircraft engines a fuel supply, a first fork-carrying rod, a second fork-carrying rod, means for causing said first rod to slide as a function of the intake and barometric pressures, a thermostat located in the intake manifold of the engine, an airtight chamber, a conduit connecting said chamber and thermostat, a capsule filled with a liquid having a high coefficient of expansion in said chamber so that deformations of said capsule are proportional to the intake temperature, a pivoted lever for transmitting the motions of said capsule to said second fork-carrying rod, so that the slidings of said second rod are proportional to the intake temperature, a shaft on which said lever pivots, a cam controlling the position of said shaft, means for controlling said cam as a function of the position of the throttle which is itself a function of the richness of the fuel mixture and of the flow coefficient to vary the proportion ratio of said lever and, consequently the amplitudes of the slidings of said second rod as a function of the richness of the fuel mixture, said rods being mounted to slide perpendicularly to one another, a lever arm, means for causing the simultaneous displacement of said two rods to act on said lever arm, an auxiliary arm connected to said lever arm, means for controlling said fuel supply by the displacement of said auxiliary arm so that said first rod causes motions proportional to its own in said controlling means in case said second rod remains motionless and, similarly, said second rod causes motions in inverse proportion to its own in said controlling means when the first rod remains motionless, the simultaneous displacement of the two rods thus ensuring the fuel supply for the aircraft engine as a function of the intake pressure, of the barometric pressure, of the intake temperature and of the richness of the fuel mixture.

6. In a fuel flow regulator for supercharged aircraft engines, a fuel supply, a first fork-carrying rod, a second fork-carrying rod, means for causing said first rod to slide as a function of the intake and barometric pressures, a thermostat located in the intake manifold of the engine, an airtight chamber, a conduit connecting said thermostat and chamber, a capsule filled with a liquid having a high coefficient of expansion so that deformation of said capsule is proportional to the intake temperature, a lever for transmitting the motions of said capsule to said second fork-carrying rod, so that the movement of said second rod is proportional to the intake temperature, a shaft on which said lever is pivoted, a cam controlling the position of said shaft, means for controlling the position of said cam as a function of the position of the throttle which is itself a function of the richness of the fuel mixture and of the flow coefficient to vary the proportion ratio of said lever and, consequently, the amplitude of the movements of said second rod as a function of the richness of the fuel mixture, an eccentric manually operable on which said cam is mounted whereby a shifting of said cam by said eccentric causes a variation in the adjustment for the richness of the mixture, said rods being mounted to slide perpendicularly to one another, a lever arm, means for causing the simultaneous displacement of said two rods to act on said lever arm, an auxiliary arm connected to said lever arm, means for controlling said fuel supply by the displacement of said auxiliary arm so that said first rod causes motions proportional to its own in said controlling means in case the second rod remains motionless, and, similarly, said second rod causes motions in inverse proportion to its own in said controlling means when the first rod remains motionless, the simultaneous displacement of said two rods ensuring the fuel supply for the aircraft engine as a function of the intake pressure, of the barometric pressure, of the intake temperature and of the richness of the fuel mixture.

7. In a fuel flow regulator for supercharged aircraft engines, a fuel supply, a first rod, a second rod, means for causing said first rod to slide as a function of the intake and barometric pressures, a thermostat located in the intake manifold of the engine, an airtight chamber, a conduit connecting said thermostat and chamber, a capsule filled with a liquid having a high coefficient of expansion in said chamber whereby deformations of said capsule are proportional to the intake temperature, a lever for transmitting the motions of said capsule to said second rod, so that the slidings of said second rod are proportional to the intake temperature, a shaft on which said lever is pivoted, a cam controlling the position of said shaft, means for controlling the position of said cam as a function of the position of the throttle, which is itself a function of the richness of the fuel mixture, and of the flow coefficient to vary the proportion ratio of said lever and, consequently the amplitudes of the slidings of said second rod as a function of the richness of the fuel mixture, a second cam for the correction of the possible lack of uniformity of the output from said fuel supply, said rods being mounted to slide perpendicularly to one another, a lever arm, means for causing the simultaneous displacement of said two rods to act on said lever arm, an auxiliary arm connected to said lever arm, a servo-motor having a slide valve for controlling said fuel supply by the displacement of said auxiliary arm so that said first rod causes motions proportional to its own of said slide valve, in case the second rod remains motionless, and similarly, said second rod causes motions in inverse proportion to its own of said slide valve when the first rod remains motionless, the simultaneous displacement of said two rods thus ensuring the fuel supply for the aircraft engine as a function of the intake pressure, of the barometric pressure, of the intake temperature and of the richness of the fuel mixture, a second lever for operating said slide valve, a shaft on which said second lever is pivoted, means controlled by said second cam for correcting the possible lack of uniformity of the output of said fuel supply for displacing said last named shaft parallel to said first rod and, consequently, perpendicularly to said second rod, to adjust the travel of said slide valve and modify said fuel supply during very high or very low speeds.

DÉSIRÉ SCHMITT.

REFERENCES CITED

The following references are of record in the file of this patent:

UNITED STATES PATENTS

| Number | Name | Date |
|---|---|---|
| 2,217,364 | Halford et al. | Oct. 8, 1940 |
| 2,245,562 | Becker | June 17, 1941 |
| 2,274,693 | Heinrich et al. | Mar. 3, 1942 |
| 2,383,563 | Pugh et al. | Aug. 28, 1945 |
| 2,388,669 | Baker | Nov. 13, 1945 |
| 2,403,398 | Reggio | July 2, 1946 |
| 2,416,797 | Dodson | Mar. 4, 1947 |
| 2,419,171 | Simpson et al. | Apr. 15, 1947 |
| 2,422,808 | Stokes | June 24, 1947 |
| 2,435,902 | Reggio | Feb. 10, 1948 |
| 2,438,663 | Greenland | Mar. 30, 1948 |